(12) United States Patent
Giannini

(10) Patent No.: US 12,084,176 B2
(45) Date of Patent: Sep. 10, 2024

(54) AIRCRAFT, A CONTROL SYSTEM FOR THE AIRCRAFT AND A METHOD OF CONTROLLING THE AIRCRAFT

(71) Applicant: The Boeing Company, Chicago, IL (US)

(72) Inventor: Francesco Giannini, Falls Church, VA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 18/045,792

(22) Filed: Oct. 11, 2022

(65) Prior Publication Data

US 2024/0116626 A1  Apr. 11, 2024

(51) Int. Cl.
*B64C 29/00* (2006.01)
(52) U.S. Cl.
CPC ................ *B64C 29/0033* (2013.01)
(58) Field of Classification Search
CPC ................................. B64C 29/0033
See application file for complete search history.

(56) References Cited

U.S. PATENT DOCUMENTS

| | | | |
|---|---|---|---|
| 3,430,894 A | 3/1969 | Strand et al. | |
| 2010/0301168 A1* | 12/2010 | Raposo | G05D 1/0858 244/171.2 |
| 2016/0031555 A1 | 2/2016 | Bevirt et al. | |
| 2017/0152935 A1* | 6/2017 | Filter | B64C 29/0033 |
| 2018/0237136 A1* | 8/2018 | Choi | B64U 40/10 |
| 2020/0023962 A1 | 1/2020 | Fillingham et al. | |
| 2020/0354052 A1* | 11/2020 | Chew | B64C 29/0025 |
| 2021/0009264 A1* | 1/2021 | Chang | B64C 5/06 |
| 2022/0009626 A1* | 1/2022 | Baharav | B64D 27/24 |

(Continued)

FOREIGN PATENT DOCUMENTS

AU   2020100605 A4   5/2020

OTHER PUBLICATIONS

Article entitled: "Ten-Engine Electric Plane Completes Successful Flight Test"; NASA Website: https://www.nasa.gov/langley/ten-engine-electric-plane-completes-successful-flight-test; dated Apr. 30, 2015; last updated Aug. 7, 2017; 5 total pages.

(Continued)

*Primary Examiner* — Tien Q Dinh
*Assistant Examiner* — William L Gmoser
(74) *Attorney, Agent, or Firm* — Quinn IP Law

(57) ABSTRACT

An aircraft, a method of controlling the aircraft, and a control system for the aircraft has a fuselage and tilt-wing movable relative to the fuselage. A plurality of main propulsors coupled to main propellers that is coupled to the tilt-wing, which are configured to provide a first maximum amount of thrust. A plurality of auxiliary propulsors coupled to auxiliary propellers that are spaced apart from the tilt-wing, which are configured to provide a variable amount of thrust. A controller signals the main propulsors to operate at the first maximum amount of thrust when the tilt-wing moves from the cruise position to the transition position, and signals the auxiliary propulsors to operate at the variable amount of thrust when the tilt-wing is in the transition position in which the first maximum amount of thrust and the variable amount of thrust together provide an overall thrust to descend and land the aircraft.

20 Claims, 8 Drawing Sheets

(56) References Cited

U.S. PATENT DOCUMENTS

2022/0144421 A1* 5/2022 Rimanelli ............ B64C 29/0033
2022/0396355 A1* 12/2022 Depape ............... B64C 29/0033
2023/0219686 A1* 7/2023 Zelayeta ................ B64D 27/24
                                                              244/6

OTHER PUBLICATIONS

Transcendair website: https://transcend.aero/aircraft; accessed on Oct. 11, 2022; 5 total pages.
Article entitled: "A Celebratory, Bittersweet Moment: Vahana's Final Flight"; Acubed website: https://acubed.airbus.com/blog/vahana/a-celebratory-bittersweet-moment-vahanas-final-flight/; dated Dec. 16, 2019; 21 total pages.

* cited by examiner

AIRCRAFT, A CONTROL SYSTEM FOR THE AIRCRAFT AND A METHOD OF CONTROLLING THE AIRCRAFT

BACKGROUND

The present disclosure generally relates to a control system for an aircraft, an aircraft, as well as associated methods for controlling the aircraft.

It has been desirable to produce an aircraft which is capable of taking-off and landing despite relatively short runway distances or no runway. This may be accomplished through increasing thrust of the aircraft and through improving lift of the aircraft. If increasing the thrust of the aircraft, larger, more-powerful engines are used which add weight to the aircraft and consume greater quantities of fuel. These types of aircraft may have a tilt-wing and engines fixed to the tilt-wing, with the engines sized to provide the total thrust to lift and land the aircraft. In this case, when landing the aircraft, the tilt-wing rotates to an inbound transition position and the engines are throttled back or throttled down to operate at a lower thrust during this inbound transition. The effective angle of attack of the tilt-wing is determined by the combination of the velocity vector and the propeller slipstream vector. Therefore, lower thrust during the inbound transition causes a lower slipstream velocity to be applied to the tilt-wing and brings the tilt-wing closer to the angle of attack that causes wing stall to occur. Wing stall is worsened when the aircraft is in a descending trajectory, with the velocity vector coming from below the tilt-wing.

SUMMARY

Therefore, it is desirable to develop a control system, an aircraft, and associated methods, that utilize a plurality of propulsors that share the thrust requirements to takeoff and land the aircraft.

The present disclosure pertains to a control system for an aircraft having a fuselage. The control system includes a tilt-wing configured to be movable relative to the fuselage between a cruise position, a transition position, and a hover position. The transition position is a plurality of positions between the hover position and the cruise position. The control system also includes a plurality of main propellers coupled to the tilt-wing such that the main propellers change orientation with movement of the tilt-wing relative to the fuselage to one of the cruise position, the transition position, and the hover position. The control system further includes a plurality of main propulsors coupled to a respective one of the main propellers. The main propulsors are configured to provide a first maximum amount of thrust to the main propellers. The control system also includes a plurality of auxiliary propellers spaced apart from the tilt-wing. In addition, the control system includes a plurality of auxiliary propulsors coupled to a respective one of the auxiliary propellers. The auxiliary propulsors are configured to provide a variable amount of thrust to the auxiliary propellers. The control system further includes a controller in communication with the tilt-wing, the main propulsors, and the auxiliary propulsors. The controller signals the main propulsors to operate at the first maximum amount of thrust when the tilt-wing moves from the cruise position to the transition position, and signals the auxiliary propulsors to operate at the variable amount of thrust when the tilt-wing is in the transition position in which the first maximum amount of thrust and the variable amount of thrust together provide an overall thrust to descend and land the aircraft.

The present disclosure pertains to an aircraft including a fuselage and a control system. The control system includes a tilt-wing supported by the fuselage. The tilt-wing is movable relative to the fuselage between a cruise position, a transition position, and a hover position. The transition position is a plurality of positions between the hover position and the cruise position. The control system also includes a plurality of main propellers coupled to the tilt-wing such that the main propellers change orientation with movement of the tilt-wing relative to the fuselage to one of the cruise position, the transition position, and the hover position. The control system further includes a plurality of main propulsors coupled to a respective one of the main propellers and the main propulsors are configured to provide a first maximum amount of thrust to the main propellers. The control system also includes a plurality of auxiliary propellers spaced apart from the tilt-wing. In addition, the control system includes a plurality of auxiliary propulsors coupled to a respective one of the auxiliary propellers and the auxiliary propulsors are configured to provide a variable amount of thrust to the auxiliary propellers. The control system includes a controller in communication with the tilt-wing, the main propulsors, and the auxiliary propulsors. The controller signals the main propulsors to operate at the first maximum amount of thrust when the tilt-wing moves from the cruise position to the transition position, and signals the auxiliary propulsors to operate at the variable amount of thrust when the tilt-wing is in the transition position in which the first maximum amount of thrust and the variable amount of thrust together provide an overall thrust to descend and land the aircraft.

The present disclosure pertains to a method of controlling an aircraft. A tilt-wing is movable relative to a fuselage from a cruise position to a transition position. The transition position is a plurality of positions between a hover position and the cruise position. A first maximum amount of thrust is implemented to a plurality of main propellers by a plurality of main propulsors. The main propellers are coupled to the tilt-wing such that the main propellers change orientation with movement of the tilt-wing relative to the fuselage to one of the cruise position, the transition position, and the hover position. A variable amount of thrust is implemented to a plurality of auxiliary propellers by a plurality of auxiliary propulsors. The auxiliary propellers are spaced apart from the tilt-wing. The main propulsors are signaled, via a controller, to operate at the first maximum amount of thrust when the tilt-wing moves from the cruise position to the transition position. The auxiliary propulsors are signaled, via the controller, to operate at the variable amount of thrust when the tilt-wing is in the transition position in which the first maximum amount of thrust and the variable amount of thrust together provide an overall thrust to descend and land the aircraft.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

Figure 1:
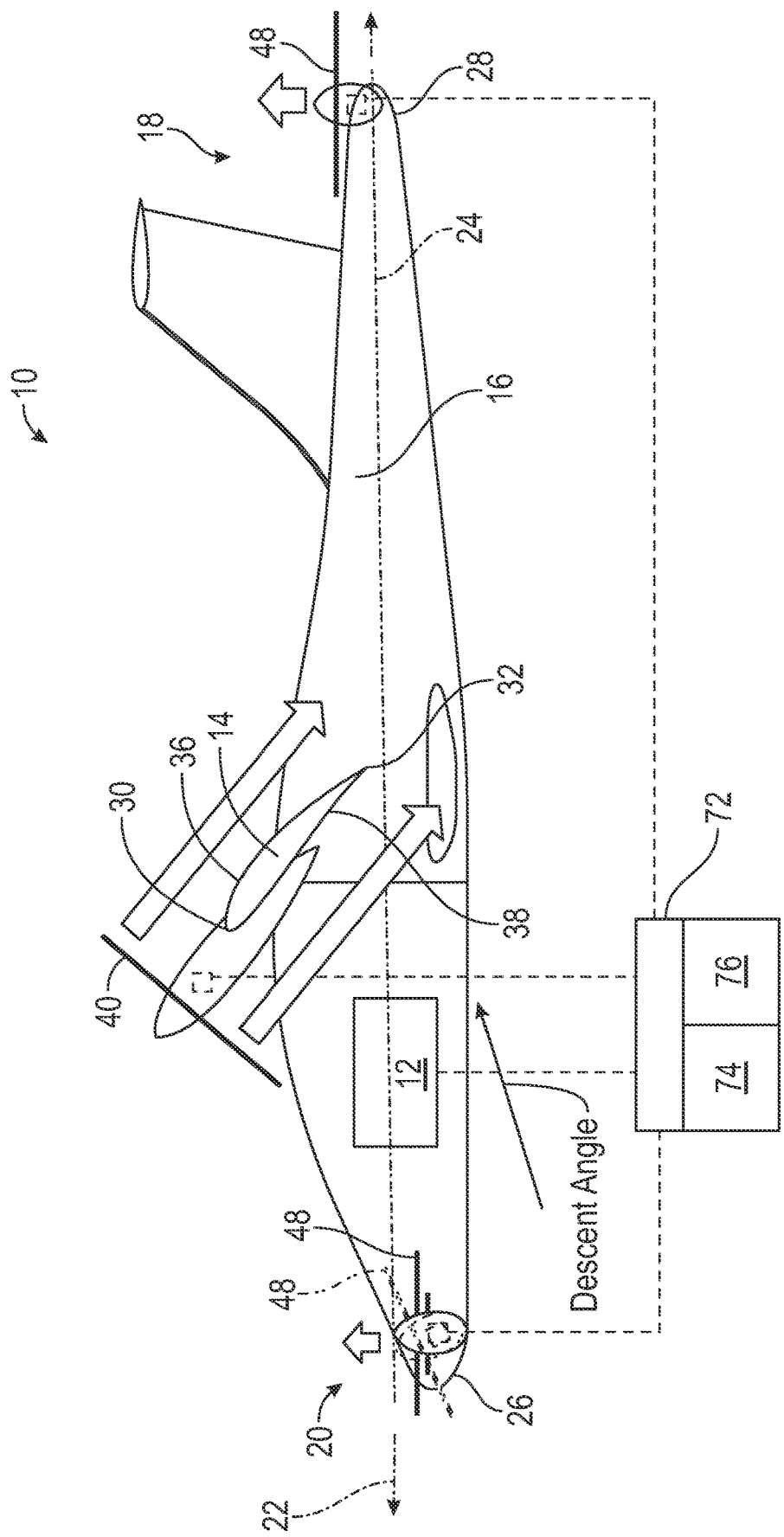
FIG. 1 is a schematic illustration of an aircraft and a control system for the aircraft, and one auxiliary propeller shown in a first orientation in solid lines, and an alternative orientation of the auxiliary propeller shown in dash-dot-dot-dashed lines.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Moreover, terms such as "first", "second", "third", and so on, may be used to describe separate components. Such terminology may include the words specifically mentioned above, derivatives thereof, and words of similar import. Furthermore, the term "substantially" can refer to a slight imprecision or slight variance of a condition, quantity, value, or dimension, etc., some of which that are within manufacturing variance or tolerance ranges.

As used herein, an element or step recited in the singular and preceded by the word "a" or "an" should be understood as not necessarily excluding the plural of the elements or steps. Further, any reference to "one configuration" is not intended to be interpreted as excluding the existence of additional configurations that also incorporate the recited features. Moreover, unless explicitly stated to the contrary, configurations "comprising" or "having" an element or a plurality of elements having a particular property may include additional elements not having that property. The phrase "at least one of" as used herein should be construed to include the non-exclusive logical "or", i.e., A and/or B and so on depending on the number of components.

Referring to the figures, wherein like numerals indicate like or corresponding parts throughout the several views, an aircraft 10 and a control system 12 for the aircraft 10 are generally shown in FIG. 1. As will be discussed in detail below, the control system 12 for the aircraft 10 may be used to improve landing of the aircraft 10 as well as delay stall of a tilt-wing 14.

Referring to FIGS. 1-8, the aircraft 10 may include a fuselage 16 and the tilt-wing 14 coupled to the fuselage 16, and more specifically, the tilt-wing 14 is supported by the fuselage 16. The fuselage 16 may include a first end 18 and a second end 20 spaced apart from each other relative to a central axis 22. Furthermore, a plane 24 intersects the fuselage 16 relative to the central axis 22. For simplicity, the plane 24 is illustrated in FIGS. 1, 2, 5, and 8, but all of the figures would have the same plane 24 even though not illustrated. The tilt-wing 14 extends across the fuselage 16 transverse to the central axis 22, and the tilt-wing 14 is spaced from the first end 18 and the second end 20. The second end 20 of the fuselage 16 may be disposed adjacent to a nose 26 of the aircraft 10 and the first end 18 of the fuselage 16 may be disposed adjacent to a tail 28 of the aircraft 10.

Generally, the aircraft 10 may takeoff from a location, cruise, and land at a desired location. The tilt-wing 14 is movable depending on the desired speed and/or operation of the aircraft 10, which will be discussed further below. The aircraft 10 may be electrically powered and/or fuel powered, or powered by any other suitable fuels, components, etc. Therefore, the aircraft 10 may include one or more electric batteries.

The aircraft 10 may takeoff and land on a runway, a landing pad, or any suitable ground. Therefore, the aircraft 10 may include a landing gear assembly indirectly or directly coupled to the fuselage 16. Optionally, the landing gear assembly may be movable relative to the fuselage 16 between a retracted position and an extended position. During landing and takeoff, the landing gear assembly is in the extended position to facilitate movement of the aircraft 10 on the ground and/or prevent the fuselage 16 from directly contacting the ground. When the aircraft 10 is in the air, if the landing gear is retractable, the landing gear assembly may move to the retracted position to minimize drag.

Figure 2:
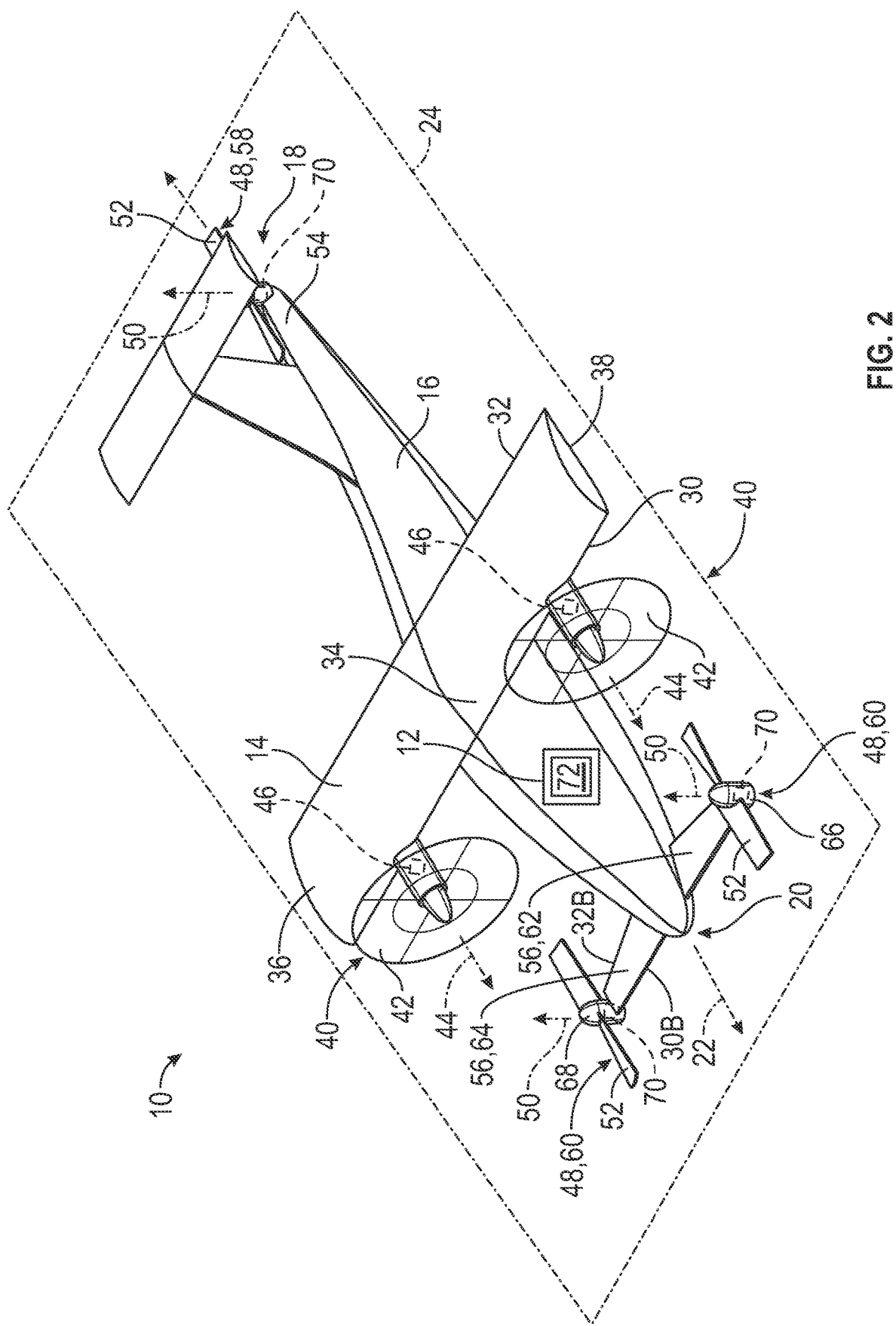
FIG. 2 is a schematic perspective view of the aircraft of FIG. 1 with a tilt-wing disposed in a cruise position.
Figure 3:
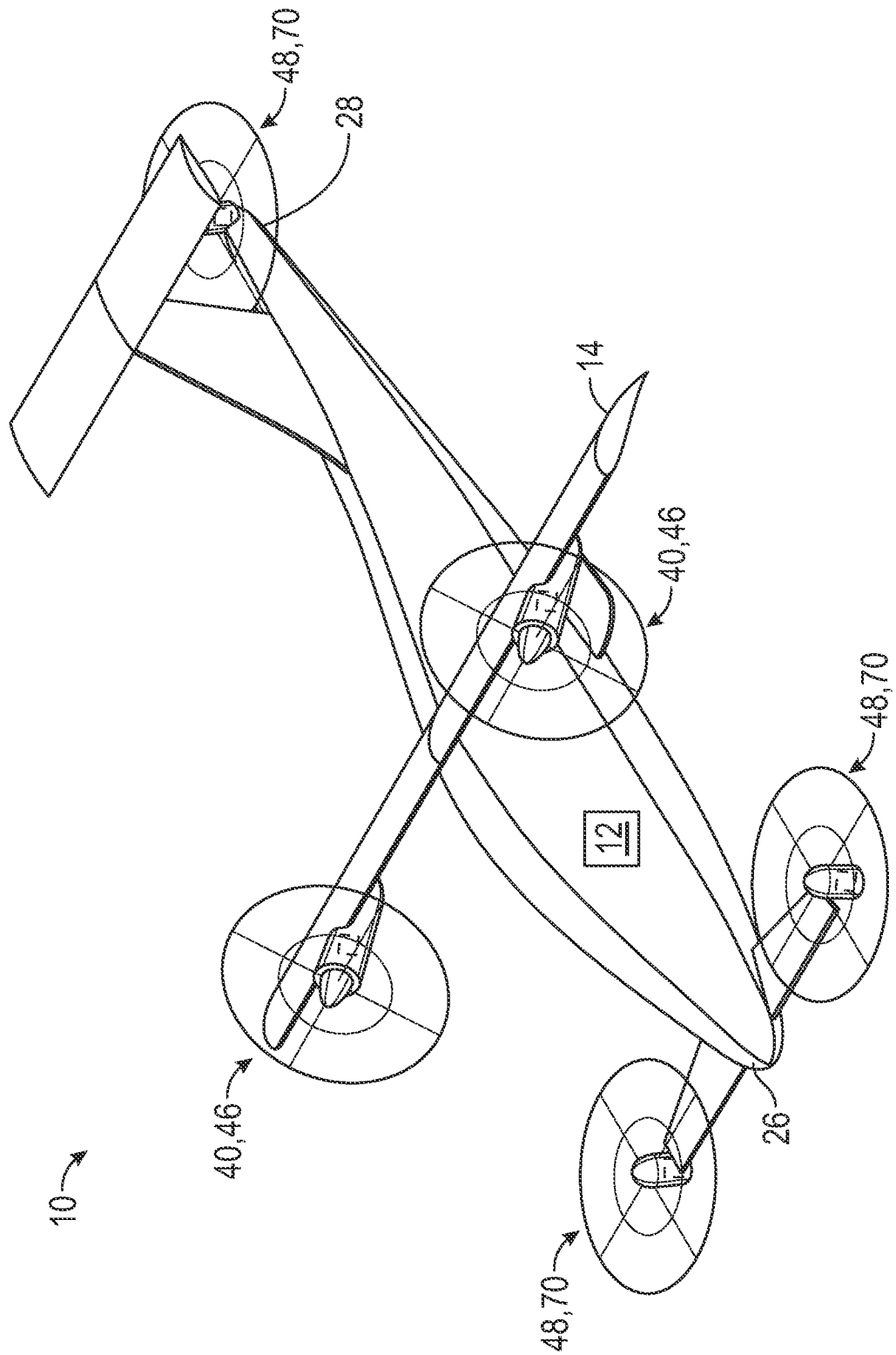
FIG. 3 is a schematic perspective view of the aircraft of FIG. 2 with the tilt-wing disposed in a transition position.
Figure 4:
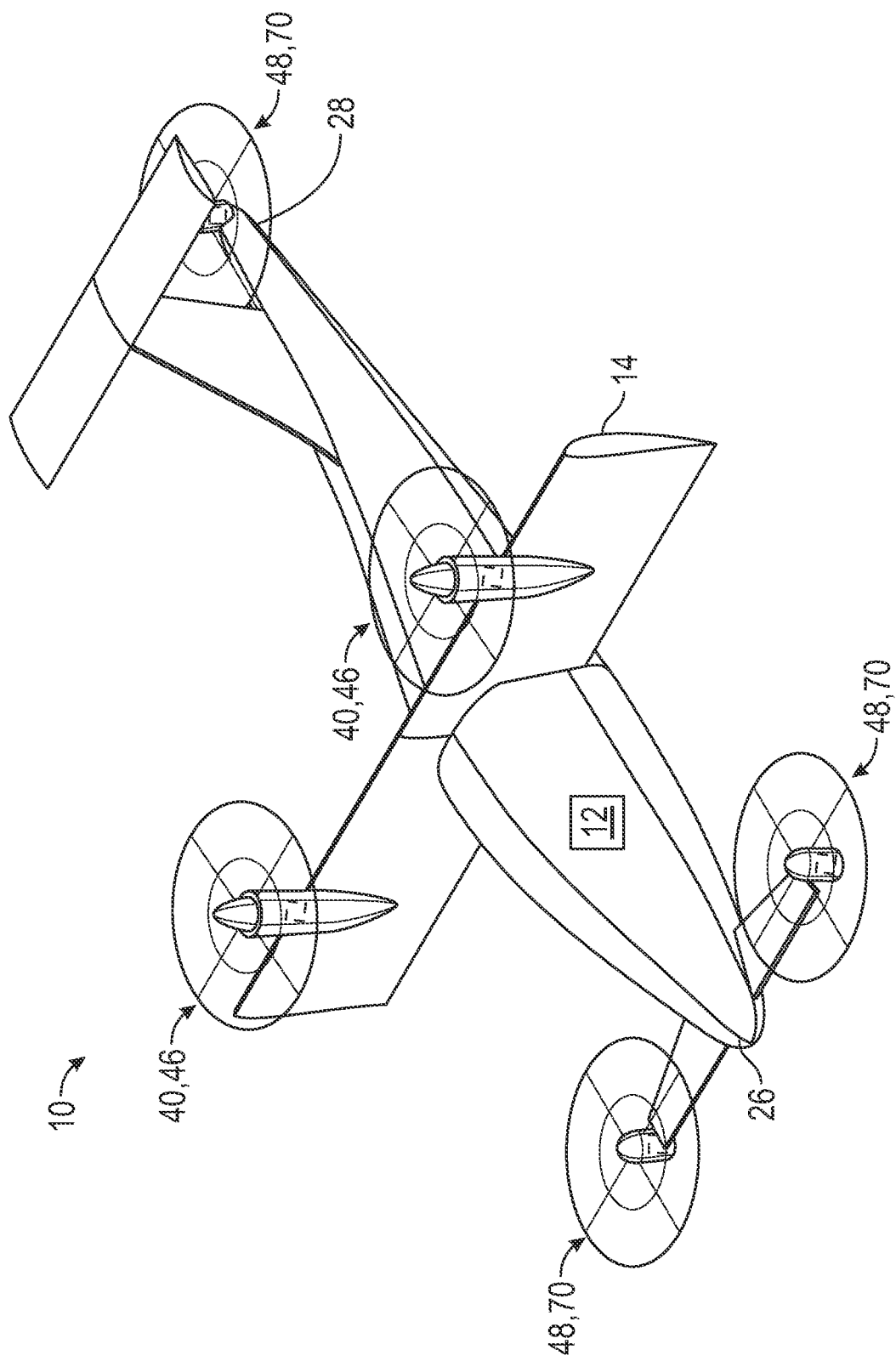
FIG. 4 is a schematic perspective view of the aircraft of FIG. 2 with the tilt-wing disposed in a hover position.
Figure 5:
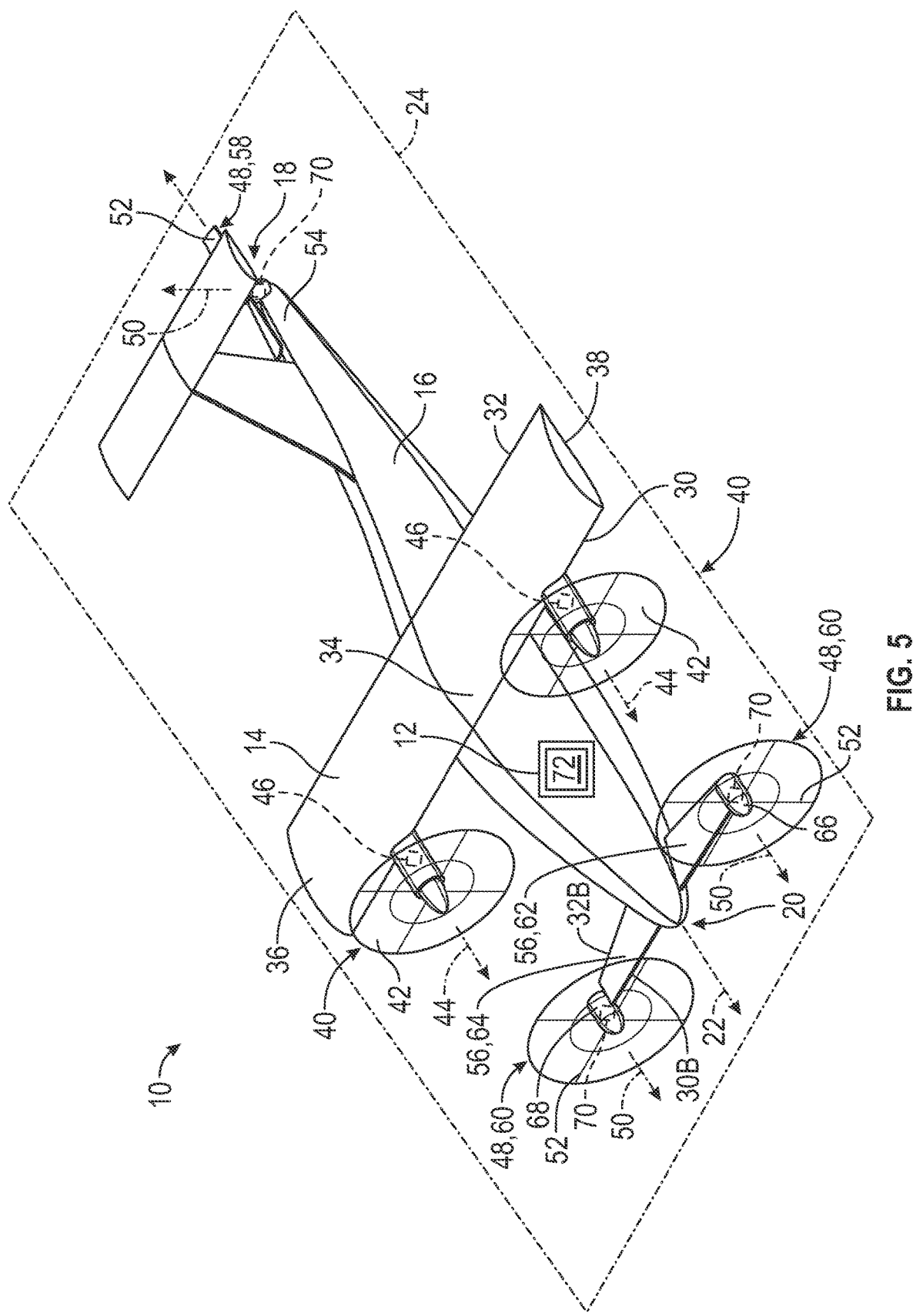
FIG. 5 is a schematic perspective view of the aircraft of FIG. 1 with the tilt-wing disposed in a cruise position, and a pair of auxiliary propellers disposed in a cruise position.
Figure 6:
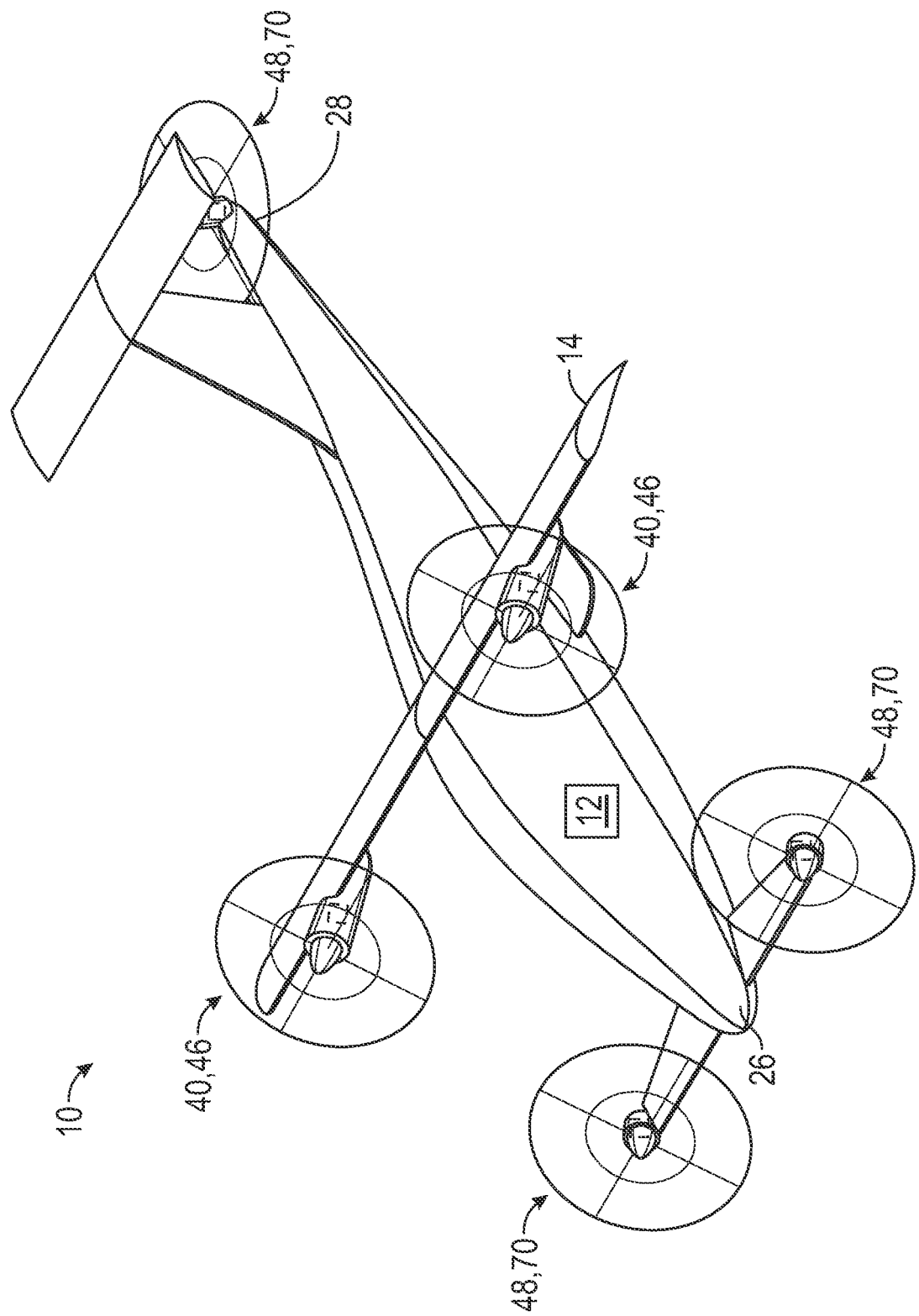
FIG. 6 is a schematic perspective view of the aircraft of FIG. 5 with the tilt-wing disposed in a transition position, and the pair of auxiliary propellers disposed in a transition position.
Figure 7:
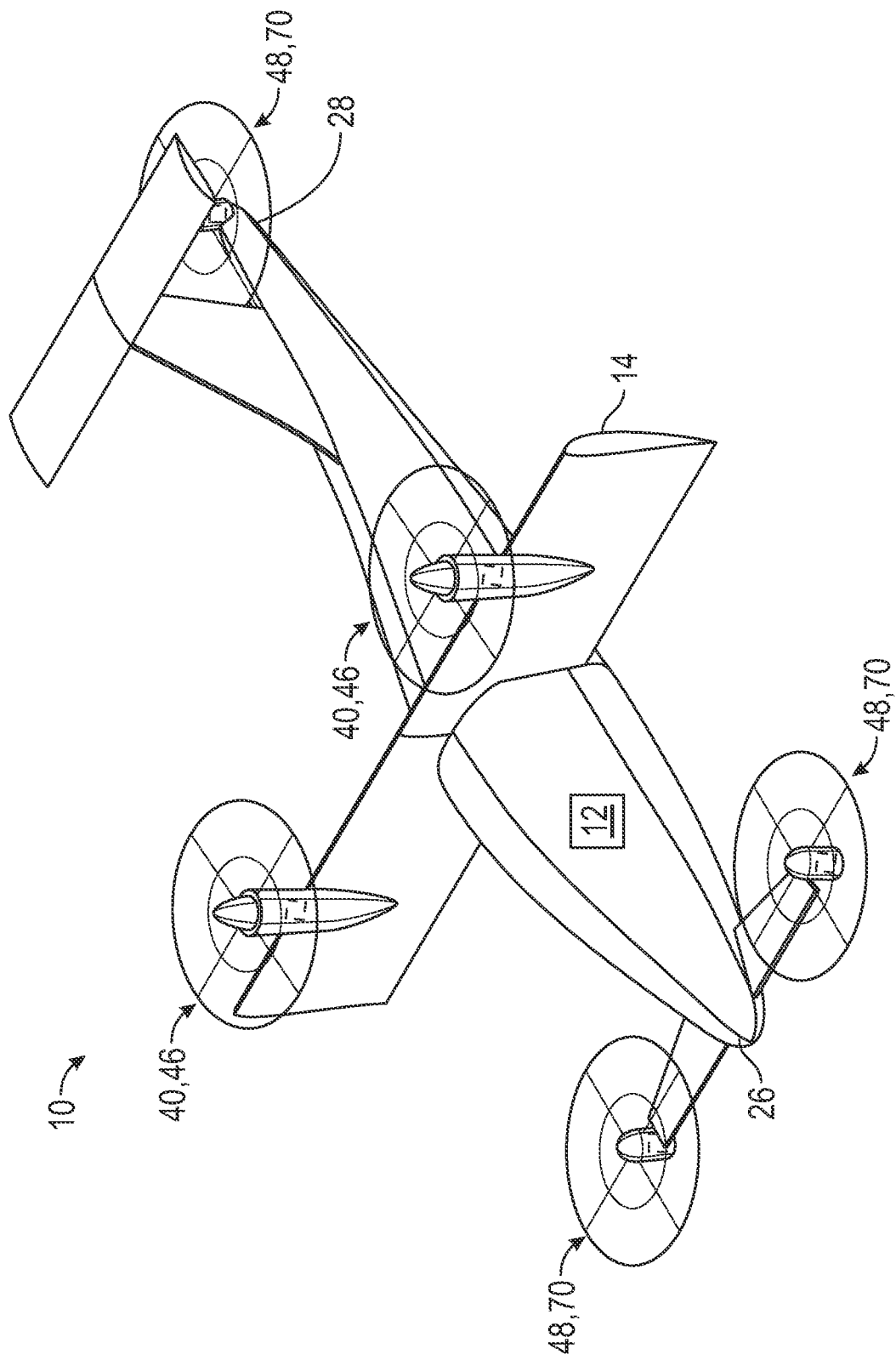
FIG. 7 is a schematic perspective view of the aircraft of FIG. 5 with the tilt-wing disposed in a hover position, and the pair of auxiliary propellers disposed in a hover position.

Continuing with FIGS. 1-8, the tilt-wing 14 is configured to be movable relative to the fuselage 16 between a cruise position (see FIGS. 2 and 5), a transition position (see FIGS. 1, 3, 6, and 8), and a hover position (see FIGS. 4 and 7). That is, the tilt-wing 14 may rotate or pivot to a different angular position relative to the fuselage 16 as shown by comparing the figures. The transition position is a plurality of positions between the hover position and the cruise position. The tilt-wing 14 is pivotable depending on the desired speed of the aircraft 10 and/or the desired operation of the aircraft 10, such as landing or taking-off or cruising. Generally, the tilt-wing 14 is pivotable relative to the fuselage 16 (compare FIGS. 1-4). For example, the tilt-wing 14 may be pivotable between the hover position (see FIGS. 4 and 7) and the cruise position (see FIGS. 2 and 5), and may rotate to the transition position (see FIGS. 1, 3, 6, and 8). The transition position is between the hover position and the cruise position. More specifically, the transition position may occur during ascent of the aircraft 10 and during descent of the aircraft 10. The transition position of the tilt-wing 14 includes any pivotable movement or position of the tilt-wing 14 between the hover position and the cruise position, and may be referred to as the tilt-wing 14 transitions between the hover position and cruise position or transitions between the cruise position and the hover position.

When the aircraft 10 is taking-off and landing, the tilt-wing 14 may be in the hover position, in which the tilt-wing 14 is substantially vertical relative to the plane 24. When the aircraft 10 is ascending or climbing after takeoff, the tilt-wing 14 may transition to the transition position, which in this case may be referred to as outbound transition. When the tilt-wing 14 is in the outbound transition, the tilt-wing 14 is transverse to the plane 24 such that the tilt-wing 14 is not substantially horizontal and not substantially vertical relative to the plane 24. When the aircraft 10 has reached the desired altitude or has leveled off after climbing, the tilt-wing 14 may be in the cruise position, in which the tilt-wing 14 is substantially horizontal relative to the plane 24. When the aircraft 10 is descending toward landing, the tilt-wing 14 may transition to the transition position, which in this case may be referred to as inbound transition. When the tilt-wing 14 is in the inbound transition, the tilt-wing 14 is transverse to the plane 24 such that the tilt-wing 14 is not substantially horizontal and not substantially vertical relative to the plane 24. It is to be appreciated that more than one tilt-wing 14 may be coupled to the fuselage 16 and may include the features described herein.

When the tilt-wing 14 is pivoted to the transition position, the transitions are done efficiently when the tilt-wing 14 is mostly unstalled, thus generating lift and only moderate amounts of drag. Generally, if a stall angle of the tilt-wing 14 is reached, the tilt-wing 14 starts to lose lift. Airflow is directed across the tilt-wing 14 during flight, and an angle of attack as seen by the tilt-wing 14 during flight depends on the direction of the airflow across the tilt-wing 14. Therefore, the transitions may be done efficiently when the angle of attack of the tilt-wing 14 is below a stall angle of the tilt-wing 14. The angle of attack across the tilt-wing 14 is greatly increased during descent (i.e., inbound transition) of the aircraft 10 when the airflow is generally directed from below the tilt-wing 14.

The aircraft 10 may include the control system 12, and the control system 12 may include various features, some of which are discussed below. The aircraft 10 and the control system 12 described herein aims to reduce stalling of the tilt-wing 14 when the aircraft 10 is functioning at low thrust and a high angle of attack, which may occur during inbound transition and may be aggravated when the aircraft 10 is in a descending trajectory.

The aircraft 10 may be a vertical take-off and landing (VTOL) type of vehicle, and in certain configurations, the VTOL type of the aircraft 10 is an electric vehicle, i.e., includes electric powered motor and/or electrical batteries. It is to be appreciated that the VTOL type of the aircraft 10 may be a fuel powered vehicle or any other suitable powered VTOL vehicle. In the configuration of the VTOL type of vehicle, the aircraft 10 may land and take-off vertically without relying on a runway, and the VTOL type of vehicle may hover vertically.

Figure 8:
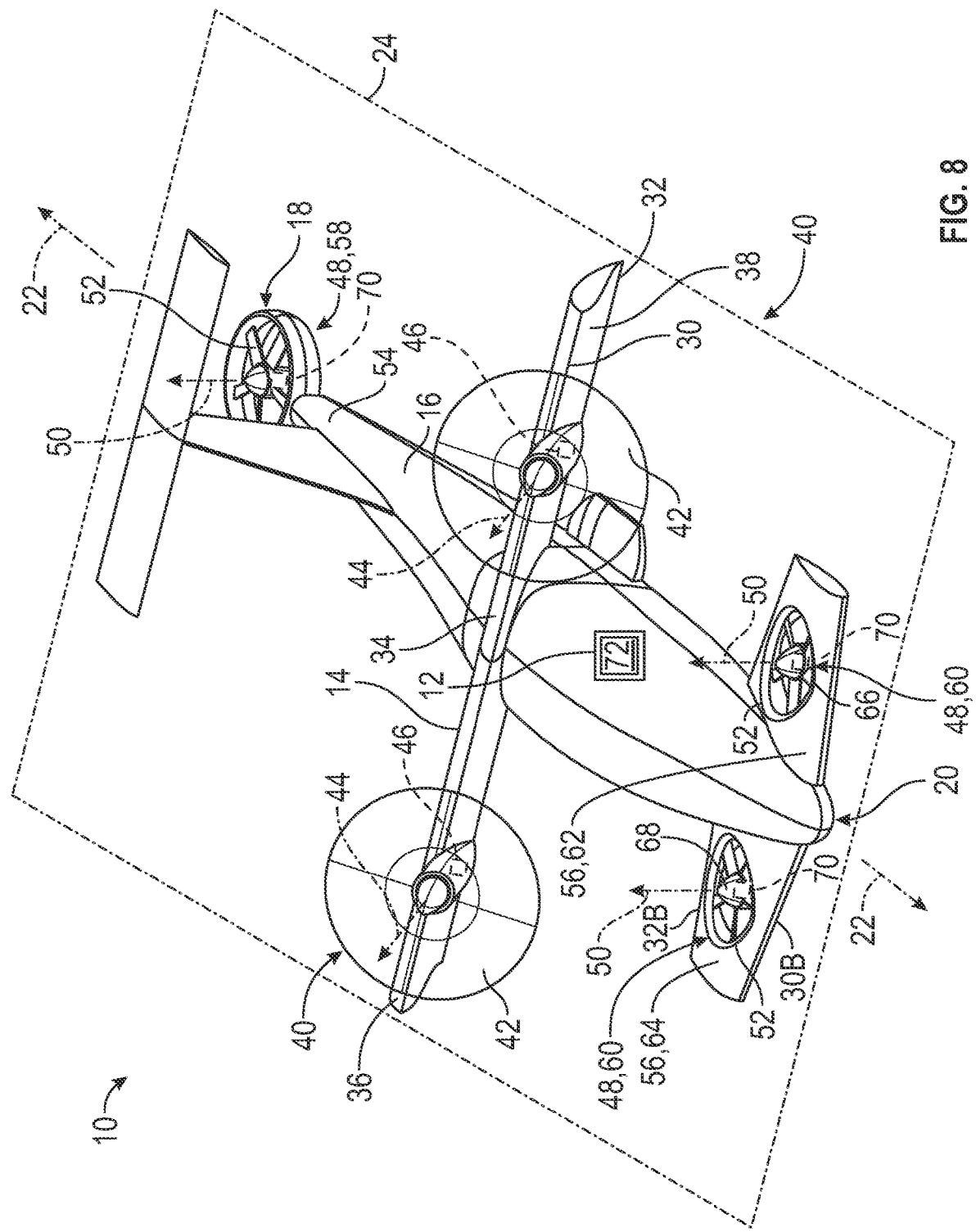
FIG. 8 is a schematic perspective view of the aircraft of FIG. 1 with a tilt-wing disposed in a transition position, and auxiliary propellers being integrated inside of supports.

Referring to FIGS. 2, 5, and 8, the tilt-wing 14 may include a leading edge 30 and a trailing edge 32 spaced from the leading edge 30. Generally, the leading edge 30 is a forward edge of the tilt-wing 14 and the trailing edge 32 is a rear edge of the tilt-wing 14, as best shown in FIGS. 2, 5, and 8. The leading edge 30 and the trailing edge 32 of the tilt-wing 14 are illustrated in all of the figures, but for simplicity, not numbered in all of the figures. Continuing with FIGS. 2, 5, and 8, the tilt-wing 14 extends outward from opposing sides of the fuselage 16, and a center section 34 of the tilt-wing 14 is disposed along the forward edge or the leading edge 30 of the tilt-wing 14 over the fuselage 16. Referring to FIG. 1, when the aircraft 10 is moving forward, the air splits at the leading edge 30, and some air flows across a top surface 36 of the tilt-wing 14 and some air flows across a bottom surface 38 of the tilt-wing 14 to the trailing edge 32, as represented via the arrows in FIG. 1.

Optionally, the aircraft 10 may include a high-lift device coupled to at least one of the leading edge 30 and the trailing edge 32 of the tilt-wing 14. Generally, the high-lift device is disposed along the tilt-wing 14 to provide a way to increase an amount of lift produced by the tilt-wing 14. One way to increase lift is by increasing the angle of attack of the tilt-wing 14 or the maximum lift coefficient of the tilt-wing 14, which may be accomplished by using the high-lift device. The angle of attack of the tilt-wing 14 may be increased up to the stall angle of the tilt-wing 14, and therefore, using the control system 12 disclosed herein provides increased margin over stall of the tilt-wing 14. Non-limiting examples of the high-lift device may include one or more flaps or slats along the leading edge 30 of the tilt-wing 14, and/or one or more flaps along the trailing edge 32 of the tilt-wing 14. The flaps/slats are movable to a deployed position in which the flaps/slats move outwardly relative to the tilt-wing 14 to deflect air. Deploying the slat(s) allows the tilt-wing 14 to operate at a higher angle of attack as compared to the slat(s) not being deployed or using the tilt-wing 14 without having the slat(s).

Referring to FIGS. 1-8, the aircraft 10, and thus the control system 12, includes a plurality of main propellers 40 coupled to the tilt-wing 14 such that the main propellers 40 change orientation with movement of the tilt-wing 14 relative to the fuselage 16 to one of the cruise position, the transition position, and the hover position. Generally, the main propellers 40 may include a plurality of first blades 42, and the first blades 42 rotate about a pivot 44 in front of the leading edge 30 of the tilt-wing 14. Therefore, each of the main propellers 40 have a respective plurality of first blades 42 that are rotatable about a respective pivot 44. The pivot 44 of the first blades 42 is illustrated in all of the figures, but for simplicity, not numbered in all of the figures. Furthermore, the first blades 42 are shown spinning in FIGS. 2-8.

For example, the first blades 42 of the main propellers 40 may be disposed substantially parallel to the plane 24 when the tilt-wing 14 is in the hover position. In addition, the first blades 42 of the main propellers 40 may be disposed transverse relative to the plane 24 when the tilt-wing 14 is in the transition position and the cruise position. In certain configurations, the first blades 42 of the main propellers 40 are disposed substantially perpendicular to the plane 24 when the tilt-wing 14 is in the cruise position.

During descent of the aircraft 10, lift is partially generated via rotation of the main propellers 40 of the tilt-wing 14. Therefore, a propeller slipstream is generated via rotation of the main propellers 40. For example, as the main propellers 40 are throttled up, the propeller slipstream increases to straighten the airflow being directed across the tilt-wing 14. It is desirable to provide sufficient propeller slipstream to prevent the tilt-wing 14 from stalling. Generally, if the main propellers 40 were throttled-back or throttled down during descent of the aircraft 10 when the tilt-wing 14 is in the transition position (inbound), the torque from a powerplant 46, 70 is decreased and the propeller slipstream (velocity) decreases, so there is a balance between throttling-back and providing enough propeller slipstream to prevent the tilt-wing 14 from stalling. However, for the present disclosure, the main propellers 40 are not throttled-back during descent of the aircraft 10 in the transition position (inbound), which maintains a maximum velocity of the propeller slipstream during descent, and thus, delay stalling of the tilt-wing 14 and decreases the angle of attack seen by the tilt-wing 14.

A layer of the air that is moving across the top surface 36 and the bottom surface 38 of the tilt-wing 14 may be referred to as a boundary layer (see arrows above and below the tilt-wing 14 in FIG. 1 to generally represent the split layer of the air). The top surface 36 of the tilt-wing 14 works more to generate lift than the bottom surface 38 of the tilt-wing 14. As the boundary layer slows down and loses energy during descent, airflow separation may occur along the tilt-wing 14. For example, during descent when thrust is generally being decreased, the propeller slipstream decreases, and thus, the boundary layer slows down which may lead to airflow separation. However, the control system 12 described herein provides a way to maintain a maximum thrust of the tilt-wing 14 (i.e., does not decrease thrust of the tilt-wing 14 during descent), which maintains the propeller slipstream, which causes the boundary layer to remain attached to the top surface 36 of the tilt-wing 14, and thus, continue to generate lift up to a maximum angle of attack of the tilt-wing 14. That is, the control system 12 prevents or limits airflow separation from the tilt-wing 14 when the tilt-wing 14 is in the transition position (inbound).

The control system 12 may also include the powerplant 46, 70 to provide torque or thrust to the aircraft 10. For example, the powerplant 46, 70 may include a plurality of main propulsors 46 that power the main propellers 40, and may be powered up or down to change the amount of thrust being provided depending on the desired operation of the aircraft 10. That is, the aircraft 10, and thus the control system 12, also includes the plurality of main propulsors 46 coupled to a respective one of the main propellers 40.

Generally, the main propulsors 46 may operate independently of each other. The main propulsors 46 are configured to provide a first maximum amount of thrust to the main propellers 40. The main propulsors 46 may also be throttled back to provide thrust below the first maximum amount of thrust. For example, the main propulsors 46 remain at the first maximum amount of thrust during descent as the tilt-wing 14 moves to the hover position. Once the tilt-wing 14 moves to hover position, the main propulsors 46 may be throttled back. The main propulsors 46 may be an engine, such as an electric motor or gas-powered motor, etc.

Referring to FIGS. 1-8, the aircraft 10, and thus the control system 12, further includes a plurality of auxiliary propellers 48 spaced apart from the tilt-wing 14. Each of the auxiliary propellers 48 is rotatable about a first pivot axis 50. In certain configurations, the auxiliary propellers 48 are fixed in a predetermined orientation relative to the fuselage 16 regardless of the position of the tilt-wing 14 (see FIGS. 2-4). In other configurations, at least one of the auxiliary propellers 48 is rotatable relative to the fuselage 16 regardless of the position of the tilt-wing 14 (see FIGS. 5-7). Therefore, depending on the orientation of the auxiliary propellers 48, the first pivot axis 50 may be transverse to the central axis 22, and more specifically, the first pivot axis 50 may be transverse to the plane 24. When at least one of the auxiliary propellers 48 are rotatable relative to the fuselage 16, the auxiliary propellers 48 may rotate to the cruise position (see FIG. 5), the transition position (see FIG. 6), and the hover position (see FIG. 7), as similarly discussed above for the tilt-wing 14.

Generally, the auxiliary propellers 48 may include a plurality of second blades 52, and the second blades 52 are rotatable about a pivot 50, such as the first pivot axis 50. Therefore, each of the auxiliary propellers 48 have a respective plurality of second blades 52 that are rotatable about the respective first pivot axis 50. The first pivot axis 50 of the second blades 52 is illustrated in all of the figures, but for simplicity, not numbered in all of the figures. It is to be appreciated that the length of the second blades 52 from the first pivot axis 50 may be the same length as the length of the first blades 42 from the pivot 44 or a different length from the length of the first blades 42 from the pivot 44. That is, the auxiliary propellers 48 may be the same length or a different length from the main propellers 40. It is also to be appreciated that one or more of the auxiliary propellers 48 may be the same length as the main propellers 40 and one or more of the auxiliary propellers 48 may be a different length from the main propellers 40. In one configuration, the length of the auxiliary propellers 48 are shorter than the length of the main propellers 40. Furthermore, the second blades 52 are shown spinning in FIGS. 3, 4, 6, and 7, and a pair of the second blades 52 are shown spinning in FIG. 5.

For example, in certain configurations, the second blades 52 of the auxiliary propellers 48 may be disposed substantially parallel to the plane 24 at all times (see FIGS. 2-4). That is, regardless of the position of the tilt-wing 14, the second blades 52 remain substantially parallel to the plane 24. Therefore, in certain configurations, the predetermined orientation of the auxiliary propellers 48 is further defined as the second blades 52 being substantially parallel to the plane 24.

In other configurations, the second blades 52 are movable relative to the fuselage 16 to the cruise position, the transition position, and the hover position. Therefore, for the auxiliary propellers 48 that are movable, the second blades 52 are disposed substantially parallel to the plane 24 when in the hover position, and the second blades 52 are disposed transverse to the plane 24 when in the transition position and the cruise position. In certain configurations, for the auxiliary propellers 48 that are movable, the second blades 52 are disposed substantially perpendicular to the plane 24 when in the cruise position.

Generally, the auxiliary propellers 48 may be supported by the fuselage 16. More specifically, one or more structures may be attached, coupled, or fixed to the fuselage 16 to support the auxiliary propellers 48, and below non-limiting examples are discussed.

Referring to FIGS. 1-8, a first support 54 and a second support 56 may be spaced apart from the first support 54, and may support the auxiliary propellers 48. The first support 54 and the second support 56 may be any suitable configuration to support the auxiliary propellers 48. The first support 54 and the second support 56 are illustrated in all of the figures, but for simplicity, not numbered in all of the figures. It is to be appreciated that one or more of the high-lift devices discussed above may be coupled to at least one of a leading edge 30B of the second support 56 and a trailing edge 32B of the second support 56.

The second blades 52 may be disposed in any suitable location, and non-limiting examples are discussed next. For example, the second blades 52 may be disposed outside, i.e., external, of the first support 54 and the second support 56 as shown in FIGS. 1-7, which may also be referred to as an open rotor configuration. As another example, the second blades 52 may be disposed inside, i.e., internal, of the first support 54 and the second support 56 as shown in FIG. 8, which may also be referred to as an in-wing fan configuration or a ducted configuration. It is to be appreciated that a combination of the open rotor configuration and the in-wing fan configuration may optionally be used for one configuration of the aircraft 10.

Generally, the tilt-wing 14 is disposed between the first support 54 and the second support 56. Furthermore, the first support 54 may be fixed to the first end 18 of the fuselage 16 and spaced apart from the tilt-wing 14. In addition, the second support 56 is fixed to the second end 20 of the fuselage 16 and spaced apart from the tilt-wing 14. Therefore, the first support 54 may be fixed adjacent to the tail 28 of the fuselage 16, and the second support 56 may be fixed adjacent to the nose 26 of the fuselage 16. At least one of the auxiliary propellers 48 is coupled to the first support 54 and at least one of the auxiliary propellers 48 is coupled to the second support 56. It is to be appreciated that the first support 54 and the second support 56 may be disposed at any suitable location along the fuselage 16, and therefore, the auxiliary propellers 48 may be disposed at any suitable location along the fuselage 16.

As best shown in all of the figures, the first support 54 is fixed to the fuselage 16. That is, the first support 54 is not rotatable relative to the fuselage 16. Furthermore, the orientation of the auxiliary propeller 48 attached to the first support 54 remains fixed relative to the first support 54. In other words, the auxiliary propeller 48 attached to the first support 54 is not rotatable relative to the fuselage 16.

Turning to the second support 56, the second support 56 may optionally be rotatable in certain configurations. Referring to FIGS. 2-4, the second support 56 is fixed to the fuselage 16, and therefore, the auxiliary propellers 48 attached to the second support 56 remain in the same orientation relative to the second support 56. That is, the auxiliary propellers 48 are fixed in the predetermined orientation relative to the fuselage 16 regardless of the position of the tilt-wing 14. Therefore, for example, the tilt-wing 14 may move relative to the fuselage 16 to the cruise position, the transition position, and the hover position, but the auxiliary propellers 48 will remain in the same position. In this configuration, the first support 54 and the second support 56 are fixed in a predetermined orientation relative to the fuselage 16 regardless of the position of the tilt-wing 14. Therefore, at least one of the auxiliary propellers 48 is coupled to first support 54 and at least one of the auxiliary propellers 48 is coupled to the second support 56 such that the auxiliary propellers 48 are fixed in the predetermined orientation relative to the fuselage 16 regardless of the position of the tilt-wing 14.

In other configurations, referring to FIGS. 5-7, at least one of the auxiliary propellers 48 is rotatable relative to the fuselage 16 regardless of the position of the tilt-wing 14. That is, at least some of the auxiliary propellers 48 are rotatable, and additionally, the tilt-wing 14 is rotatable. In other words, at least some of the auxiliary propellers 48 may pivot to a different angular position relative to the fuselage 16 (compare the figures, but also see FIG. 1 which illustrates one of the auxiliary propellers 48 in phantom lines rotated to a different angular position as compared to the same one of the auxiliary propellers 48 in solid lines). In this configuration, the first support 54 is fixed in a predetermined orientation relative to the fuselage 16 regardless of the position of the tilt-wing 14, and the second support 56 may be rotatable relative to the fuselage 16 regardless of the position of the tilt-wing 14. For example, the second support 56 may be coupled to the fuselage 16 to allow rotation of the second support 56, which correspondingly rotates the at least one of the auxiliary propellers 48. Therefore, the second support 56 may pivot to a different angular position relative to the fuselage 16. As another example, the second support 56 remains fixed relative to the fuselage 16 but the at least one of the auxiliary propellers 48 is rotatable relative to the second support 56. That is, the at least one of the auxiliary propellers 48 may be rotatable relative to the second support 56 while the second support 56 remains stationary. Referring to FIGS. 5-7, the auxiliary propellers 48 attached to the second support 56 may be movable to different orientations relative to the fuselage 16. It is to be appreciated that the auxiliary propellers 48 of FIG. 8 may optionally be rotatable relative to the fuselage 16 as similarly discussed above for FIGS. 5-7.

For illustrative purposes, in certain configurations, such as FIGS. 2-8, one of the auxiliary propellers 48 is coupled to the first support 54, and two or more auxiliary propellers 48 are coupled to the second support 56. Therefore, the auxiliary propellers 48 may include a first auxiliary propeller 58 coupled to the first support 54 and a second auxiliary propeller 60 coupled to the second support 56. It is to be appreciated that any suitable number of auxiliary propellers 48 may be used, and the figures are for illustrative purposes only.

The second blades 52 of one of the auxiliary propellers 48 is rotatable about the first pivot axis 50 mounted to the first support 54, but the first auxiliary propeller 58 is fixed to the first support 54 in the predetermined orientation. Furthermore, the second blades 52 of the other auxiliary propellers 48 are rotatable about a respective first pivot axis 50 mounted to the second support 56. In this configuration, the second auxiliary propeller 60 is rotatable in response to rotation of the second support 56. Referring to FIGS. 1-7, the second blades 52 of the second auxiliary propellers 60 are disposed outside of the second support 56, and for example, the second blades 52 are disposed in front of the leading edge 30B of the second support 56. Continuing with FIGS. 1-7, the second blades 52 of the first auxiliary propeller 58 of the first support 54 may be disposed above the first support 54.

Turning to the second support 56, for example, the second support 56 may include a first segment 62 coupled to one side of the fuselage 16 and a second segment 64 coupled to another side of the fuselage 16, which may oppose the first segment 62. In certain configurations, the first segment 62 is fixed to the fuselage 16 and the second segment 64 is fixed to the fuselage 16. In other configurations, the first segment 62 and the second segment 64 may be rotatable relative to the fuselage 16 which changes the orientation of the auxiliary propellers 48 relative to the fuselage 16. It is to be appreciated that the first segment 62 and the second segment 64 being fixed or rotatable may have the second blades 52 in any location, i.e., external or internal to the first segment 62 and the second segment 64.

Regarding the configuration of FIGS. 5-7, in which some of the auxiliary propellers 48 are rotatable, the second support 56 may include a first propeller housing 66 rotatably coupled to the first segment 62 and a second propeller housing 68 rotatably coupled to the second segment 64. That is, in certain configurations, the first segment 62 and the second segment 64 are fixed to the fuselage 16 such that the first segment 62 and the second segment 64 remain stationary relative to the fuselage 16, and the rotatable portion of the second support 56 is the first propeller housing 66 and the second propeller housing 68.

As discussed above, the powerplant 46, 70 provides torque or thrust to the aircraft 10. As discussed above, the main propulsors 46 provide thrust to the main propellers 40. In addition, the powerplant 46, 70 may include a plurality of auxiliary propulsors 70 that power the auxiliary propellers 48 and may be powered up or down to change the amount of thrust being provided depending on the desired operation of the aircraft 10. That is, the aircraft 10, and thus the control system 12, also includes the plurality of auxiliary propulsors 70 coupled to a respective one of the auxiliary propellers 48.

Generally, the auxiliary propulsors 70 may operate independently of each other and independently of the main propulsors 46. The auxiliary propulsors 70 are configured to provide a variable amount of thrust to the auxiliary propellers 48. Furthermore, the auxiliary propulsors 70 may be oriented such that wing stall does not occur during descent of the aircraft 10.

Depending on the desired operation of the aircraft 10, the main propulsors 46 and the auxiliary propulsors 70 may be powered to a maximum amount of thrust, a minimum amount of thrust, or any amount of thrust between the maximum amount and the minimum amount of thrust. However, for descent of the aircraft 10 to land, it is desirable to operate the main propulsors 46 at the first maximum amount of thrust, as discussed below.

Depending on the desired maneuver of the aircraft 10, one or more of the main propulsors 46 and the auxiliary propulsors 70 may be activated to provide a certain amount of thrust. The auxiliary propulsors 70 supplement the main propulsors 46 to provide the desired amount of thrust to maneuver of the aircraft 10. That is, the main propulsors 46 and the auxiliary propulsors 70 share the thrust lifting capabilities of the aircraft 10. For example, a threshold amount of thrust lifts the aircraft 10 during takeoff when the tilt-wing 14 is in the hover position. Generally, the first maximum amount of thrust of the main propulsors 46 is less than the threshold amount of thrust to lift the aircraft 10 during takeoff. Therefore, the main propulsors 46 alone do not have enough thrust to lift the aircraft 10 during takeoff (i.e., the main propulsors 46 are not sized to provide the total thrust to lift the aircraft 10 during takeoff). The main propulsors 46 operate at the first maximum amount of thrust and the auxiliary propulsors 70 operate at a second maximum amount of thrust, which in combination with the first maximum amount of thrust, meet the threshold amount of thrust to lift the aircraft 10 during takeoff when the tilt-wing 14 is in the hover position.

When the aircraft 10 is landing, the main propulsors 46 remain at the first maximum amount of thrust during descent until the tilt-wing 14 moves to the hover position. That is, the main propulsors 46 remain at the first maximum amount of thrust during inbound transition until the tilt-wing 14 moves to the hover position, at which time the main propulsors 46 may be throttled down. The main propulsors 46 are operated at the first maximum amount of thrust during inbound transition to land the aircraft 10 in order to provide a maximum amount of slipstream velocity to the tilt-wing 14, which delays wing stall (as compared to designs in which the engines of the tilt-wing are sized to provide the total thrust to lift the aircraft, which in this case, the engines are throttled down to operate at a lower thrust during inbound transition which causes a lower slipstream velocity to be applied to the tilt-wing, and thus, cause wing stall to occur sooner).

The auxiliary propulsors 70 are varied during landing of the aircraft 10 (while the main propulsors 46 are operated at the first maximum amount of thrust to land the aircraft 10). That is, while the main propulsors 46 remain at the first maximum amount of thrust, the auxiliary propulsors 70 may be varied to land the aircraft 10, and thus, generally, the variable amount of thrust of the auxiliary propulsors 70 decreases during descent when the tilt-wing 14 is in the transition position to land the aircraft 10. For example, the variable amount of thrust of the auxiliary propulsors 70 decreases during descent when the tilt-wing 14 is in the transition position. Therefore, the auxiliary propulsors 70 are mainly used to decrease an overall thrust of the aircraft 10 to land the aircraft 10. It is to be appreciated that the auxiliary propulsors 70 may be operated independently of each other to control altitude of the aircraft 10 and/or to also control pitch, etc. of the aircraft 10.

The control system 12 further includes a controller 72 in communication with the tilt-wing 14, the main propulsors 46, and the auxiliary propulsors 70. The controller 72 signals the main propulsors 46 to operate at the first maximum amount of thrust when the tilt-wing 14 moves from the cruise position to the transition position, and signals the auxiliary propulsors 70 to operate at the variable amount of thrust when the tilt-wing 14 is in the transition position in which the first maximum amount of thrust and the variable amount of thrust together provide the overall thrust to descend and land the aircraft 10. By having the main propulsors 46 and the auxiliary propulsors 70 operate together to provide the overall thrust, the thrust capability of the main propulsors 46 may be reduced as compared to an aircraft that sizes the engines on the tilt-wing to provide all of the thrust to lift, descend and land the aircraft. Therefore, for the present disclosure, the main propulsors 46 alone do not provide the overall thrust to takeoff and land the aircraft 10.

The controller 72 is configured to execute the instructions from memory 74, via a processor 76. For example, the controller 72 may be a host machine or distributed system, e.g., a computer such as a digital computer or microcomputer, and, as the memory 74, tangible, non-transitory computer-readable memory such as read-only memory (ROM) or flash memory. The controller 72 may also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 72 may include all software, hardware, memory 74, algorithms, connections, sensors, etc., necessary to control, for example, the tilt-wing 14, the main propulsors 46, and the auxiliary propulsors 70. As such, a control method operative to control the aircraft 10, such as the tilt-wing 14, the main propulsors 46, and the auxiliary propulsors 70, may be embodied as software or firmware associated with the controller 72. It is to be appreciated that the controller 72 may also include any device capable of analyzing data from various sensors, comparing data, making the necessary decisions required to control the aircraft 10. Optionally, more than one controller 72 may be utilized.

The present disclosure also provides a method of controlling the aircraft 10. The controller 72 communicates with various components and systems of the aircraft 10 to control flight of the aircraft 10. For example, the tilt-wing 14 is movable relative to the fuselage 16 from the cruise position to the transition position. As mentioned above, the transition position is the plurality of positions between the hover position and the cruise position. Depending on the desired maneuver of the aircraft 10, the controller 72 signals the tilt-wing 14 to rotate, the main propulsors 46 and/or the auxiliary propulsors 70 to provide a certain amount of thrust, and optionally, signal one or more of the auxiliary propellers 48 to rotate.

As discussed above, the main propellers 40 are coupled to the tilt-wing 14 such that the main propellers 40 change orientation with movement of the tilt-wing 14 relative to the fuselage 16 to one of the cruise position, the transition position, and the hover position. As also discussed above, the auxiliary propellers 48 are spaced apart from the tilt-wing 14. In certain configurations, the auxiliary propellers 48 are fixed in the predetermined orientation relative to the fuselage 16 regardless of the position of the tilt-wing 14. In other configurations, at least one of the auxiliary propellers 48 is rotatable relative to the fuselage 16 regardless of the position of the tilt-wing 14.

The first maximum amount of thrust is implemented to the plurality of main propellers 40 by the plurality of main propulsors 46. For example, the main propulsors 46 are signaled, via the controller 72, to operate at the first maximum amount of thrust when the tilt-wing 14 moves from the cruise position to the transition position (inbound transition, the aircraft 10 is descending). The variable amount of thrust is implemented to the plurality of auxiliary propellers 48 by the plurality of auxiliary propulsors 70. For example, the auxiliary propulsors 70 are signaled, via the controller 72, to operate at the variable amount of thrust when the tilt-wing 14 is in the transition position (inbound transition) in which the first maximum amount of thrust and the variable amount of thrust together provide the overall thrust to descend and land the aircraft 10. The variable amount of thrust is referring to the ability to change or adjust the amount of thrust supplied to the auxiliary propellers 48 to perform a desired operation.

The main propulsors 46 may continue to operate at the first maximum amount of thrust to provide a maximum slipstream velocity across the tilt-wing 14 during descent as the tilt-wing 14 moves from the transition position to the hover position. By maintaining the maximum velocity of the propeller slipstream during descent, the boundary layer remains attached to the top surface 36 of the tilt-wing 14, and thus, continues to generate lift as the angle of attack increases. That is, the method prevents or limits airflow separation from the tilt-wing 14 when the tilt-wing 14 is in the transition position (inbound), which delays stalling of the tilt-wing 14 as the angle of attack increases. Therefore, higher angles of attack may be reached during descent in the transition position of the tilt-wing 14 by maintaining the maximum velocity of the propeller slipstream.

Furthermore, the variable amount of thrust of the auxiliary propulsors 70 may be decreased during descent when the tilt-wing 14 is in the transition position, and the controller 72 continues to monitor/control the amount of thrust being supplied to the main propellers 40 and the auxiliary propellers 48 during descent. If the aircraft 10 uses auxiliary propellers 48 that rotate to the different angular position relative to the fuselage 16, during descent, the controller 72 also signals the auxiliary propellers 48 to rotate from the cruise position to the transition position (see FIG. 6).

The controller 72 may also monitor a position of the aircraft 10 as the aircraft 10 descends. The variable amount of thrust of at least one of the auxiliary propulsors 70 may be independently adjusted during descent depending on the position of the aircraft 10 as the aircraft 10 descends. The auxiliary propulsors 70 may operate independently of each other and operate independently of the main propulsors 46, during descent, as well as during takeoff and cruising. Therefore, the auxiliary propulsors 70 may control the altitude of the aircraft 10 during descent/landing, as well as control pitch, etc. of the aircraft 10 during descent. It is to be appreciated that the controller 72 may be in communication with one or more accelerators, gyroscopes, sensors regarding thrust changes, etc., and use that information to assist in descending/landing the aircraft 10.

Once the tilt-wing 14 is rotated from the transition position to the hover position, the controller 72 may signal the main propulsors 46 to decrease the amount of thrust to land the aircraft 10. In addition, the controller 72 may signal the auxiliary propulsors 70 to decrease the amount of thrust to land the aircraft 10. When the aircraft 10 lands on the ground, the controller 72 may signal the main propulsors 46 and/or the auxiliary propulsors 70 to turn off.

When it is desirable to fly the aircraft 10, the tilt-wing 14 is disposed in the hover position. If the aircraft 10 uses auxiliary propellers 48 that are rotatable, the auxiliary propellers 48 are also disposed in the hover position (see FIG. 7). Regarding takeoff of the aircraft 10, the main propulsors 46 may operate at the first maximum amount of thrust during takeoff when the tilt-wing 14 is in the hover position. However, the first maximum amount of thrust provided by the main propulsors 46 when in the hover position is not large enough to lift the aircraft 10. That is, the first maximum amount of thrust of the main propulsors 46 is less than the threshold amount of thrust to lift the aircraft 10 during takeoff (when in the hover position). Therefore, the auxiliary propulsors 70 are operated as well to lift the aircraft 10. Specifically, the auxiliary propulsors 70 may be operated at the second maximum amount of thrust, which in combination with the first maximum amount of thrust of the main propulsors 46, meets the threshold amount of thrust to lift the aircraft 10 during takeoff when the tilt-wing 14 is in the hover position. Therefore, to airborne the aircraft 10 at takeoff, the main propulsors 46 operate at the first maximum amount of thrust, and additionally, the auxiliary propulsors 70 operate at the second maximum amount of thrust.

When the desired altitude is reached, the controller 72 may signal the tilt-wing 14 to rotate to the transition position (outbound), and if the aircraft 10 uses auxiliary propellers 48 that are rotatable, the auxiliary propellers 48 are also disposed in the transition position (see FIG. 6). Then, the controller 72 may signal the main propulsors 46 and/or the auxiliary propulsors 70 to adjust the amount of thrust being supplied to the main propellers 40 and/or the auxiliary propellers 48 when in the transition position.

When the desired altitude is reached after outbound transition, the controller 72 may signal the tilt-wing 14 to rotate from the transition position to the cruise position, and if the aircraft 10 uses auxiliary propellers 48 that are rotatable, the auxiliary propellers 48 are also disposed in the cruise position (see FIG. 5). For the configuration where the auxiliary propellers 48 remain fixed relative to the fuselage 16, then the controller 72 may signal the auxiliary propulsors 70 to turn off when in the cruise position as shown in FIG. 2. For the configuration where the auxiliary propellers 48 are rotatable, then the controller 72 may signal the auxiliary propulsors 70 to adjust the amount of thrust being supplied to the main propellers 40 and/or the auxiliary propellers 48 when in the cruise position. That is, one or more of the auxiliary propellers 48 may continue to operate when in the cruise position for the configuration of FIG. 5, and generally, the auxiliary propeller 48 disposed at the tail 28 of the fuselage 16 is turned off when in the cruise position.

It is to be appreciated that the order or sequence of performing the method as described herein is for illustrative purposes and other orders or sequences are within the scope of the present teachings. It is to also be appreciated that the method can include other features not specifically discussed immediately above.

The various discussions herein about the amount of thrust (i.e., amount of thrust, overall thrust, first maximum amount of thrust, variable amount of thrust, threshold amount of thrust, second maximum amount of thrust, or any other reference to thrust) may be any suitable amount based on engineering requirements, government requirements, etc. In addition, the various discussions herein about the maximum slipstream velocity may be any suitable amount based on engineering requirements, government requirements, etc.

The following Clauses provide some example configurations of the control system, the aircraft, and the method as disclosed herein.

Clause 1: A control system for an aircraft having a fuselage, the control system comprising: a tilt-wing configured to be movable relative to the fuselage between a cruise position, a transition position, and a hover position, wherein the transition position is a plurality of positions between the hover position and the cruise position; a plurality of main propellers coupled to the tilt-wing such that the main propellers change orientation with movement of the tilt-wing relative to the fuselage to one of the cruise position, the transition position, and the hover position; a plurality of main propulsors coupled to a respective one of the main propellers and the main propulsors are configured to provide a first maximum amount of thrust to the main propellers; a plurality of auxiliary propellers spaced apart from the tilt-wing; a plurality of auxiliary propulsors coupled to a respective one of the auxiliary propellers and the auxiliary propulsors are configured to provide a variable amount of thrust to the auxiliary propellers; and a controller in communication with the tilt-wing, the main propulsors, and the auxiliary propulsors, wherein the controller signals the main propulsors to operate at the first maximum amount of thrust when the tilt-wing moves from the cruise position to the transition position, and signals the auxiliary propulsors to operate at the variable amount of thrust when the tilt-wing is in the transition position in which the first maximum amount of thrust and the variable amount of thrust together provide an overall thrust to descend and land the aircraft.

Clause 2: The control system as set forth in clause 1 wherein: a threshold amount of thrust lifts the aircraft during takeoff when the tilt-wing is in the hover position; and the first maximum amount of thrust of the main propulsors is less than the threshold amount of thrust to lift the aircraft during takeoff.

Clause 3: The control system as set forth in clause 2 wherein the main propulsors operate at the first maximum amount of thrust and the auxiliary propulsors operate at a second maximum amount of thrust which in combination with the first maximum amount of thrust meet the threshold amount of thrust to lift the aircraft during takeoff when the tilt-wing is in the hover position.

Clause 4: The control system as set forth in any one of the preceding clauses wherein the auxiliary propellers are fixed in a predetermined orientation relative to the fuselage regardless of the position of the tilt-wing.

Clause 5: The control system as set forth in clause 4: further comprising a first support and a second support spaced apart from the first support; wherein the tilt-wing is disposed between the first support and the second support; wherein the first support and the second support are fixed in a predetermined orientation relative to the fuselage regardless of the position of the tilt-wing; and wherein at least one of the auxiliary propellers is coupled to first support and at least one of the auxiliary propellers is coupled to the second support such that the auxiliary propellers are fixed in the predetermined orientation relative to the fuselage regardless of the position of the tilt-wing.

Clause 6: The control system as set forth in clauses 1, 2, or 3 wherein at least one of the auxiliary propellers is rotatable relative to the fuselage regardless of the position of the tilt-wing.

Clause 7: The control system as set forth in clause 6: further comprising a first support and a second support spaced apart from the first support, and the first support is fixed in a predetermined orientation relative to the fuselage regardless of the position of the tilt-wing, and the second support is rotatable relative to the fuselage regardless of the position of the tilt-wing; wherein the tilt-wing is disposed between the first support and the second support; wherein the auxiliary propellers include a first auxiliary propeller coupled to the first support such that the first auxiliary propeller is fixed to the first support in a predetermined orientation; and wherein the auxiliary propellers include a second auxiliary propeller coupled to the second support such that the second auxiliary propeller is rotatable in response to rotation of the second support.

Clause 8: The control system as set forth in any one of the preceding clauses wherein: the main propulsors operate independently of each other; and the auxiliary propulsors operate independently of each other and independently of the main propulsors.

Clause 9: The control system as set forth in any one of the preceding clauses wherein: the main propellers include a plurality of first blades disposed substantially parallel to a plane when the tilt-wing is in the hover position; and the auxiliary propellers include a plurality of second blades disposed substantially parallel to the plane when the tilt-wing is in the hover position.

Clause 10: The control system as set forth in any one of the preceding clauses wherein: the main propulsors remain at the first maximum amount of thrust during descent until the tilt-wing moves to the hover position; and the variable amount of thrust of the auxiliary propulsors decrease during descent when the tilt-wing is in the transition position.

Clause 11: An aircraft comprising: a fuselage; a control system including: a tilt-wing supported by the fuselage and movable relative to the fuselage between a cruise position, a transition position, and a hover position, wherein the transition position is a plurality of positions between the hover position and the cruise position; a plurality of main propellers coupled to the tilt-wing such that the main propellers change orientation with movement of the tilt-wing relative to the fuselage to one of the cruise position, the transition position, and the hover position; a plurality of main propulsors coupled to a respective one of the main propellers and the main propulsors are configured to provide a first maximum amount of thrust to the main propellers; a plurality of auxiliary propellers spaced apart from the tilt-wing; a plurality of auxiliary propulsors coupled to a respective one of the auxiliary propellers and the auxiliary propulsors are configured to provide a variable amount of thrust to the auxiliary propellers; and a controller in communication with the tilt-wing, the main propulsors, and the auxiliary propulsors, wherein the controller signals the main propulsors to operate at the first maximum amount of thrust when the tilt-wing moves from the cruise position to the transition position, and signals the auxiliary propulsors to operate at the variable amount of thrust when the tilt-wing is in the transition position in which the first maximum amount of thrust and the variable amount of thrust together provide an overall thrust to descend and land the aircraft.

Clause 12: The aircraft as set forth in clause 11 wherein: a threshold amount of thrust lifts the aircraft during takeoff when the tilt-wing is in the hover position; the first maximum amount of thrust of the main propulsors is less than the threshold amount of thrust to lift the aircraft during takeoff; and the main propulsors operate at the first maximum amount of thrust and the auxiliary propulsors operate at a second maximum amount of thrust which in combination with the first maximum amount of thrust meet the threshold amount of thrust to lift the aircraft during takeoff when the tilt-wing is in the hover position.

Clause 13: The aircraft as set forth in clauses 11 or 12 wherein at least one of the auxiliary propellers is rotatable relative to the fuselage regardless of the position of the tilt-wing.

Clause 14: The aircraft as set forth in clauses 11, 12, or 13: further comprising a first support and a second support spaced apart from the first support, and the first support is fixed in a predetermined orientation relative to the fuselage regardless of the position of the tilt-wing, and the second support is rotatable relative to the fuselage regardless of the position of the tilt-wing; wherein the tilt-wing is disposed between the first support and the second support; wherein the auxiliary propellers include a first auxiliary propeller coupled to the first support such that the first auxiliary propeller is fixed to the first support in a predetermined orientation; and wherein the auxiliary propellers include a second auxiliary propeller coupled to the second support such that the second auxiliary propeller is rotatable in response to rotation of the second support.

Clause 15: The aircraft as set forth in clauses 11 or 12 wherein the auxiliary propellers are fixed in a predetermined orientation relative to the fuselage regardless of the position of the tilt-wing.

Clause 16: The aircraft as set forth in clauses 11, 12, or 15: further comprising a first support and a second support spaced apart from the first support; wherein the tilt-wing is disposed between the first support and the second support; wherein the first support and the second support are fixed in a predetermined orientation relative to the fuselage regardless of the position of the tilt-wing; and wherein at least one of the auxiliary propellers is coupled to first support and at least one of the auxiliary propellers is coupled to the second support such that the auxiliary propellers are fixed in the predetermined orientation relative to the fuselage regardless of the position of the tilt-wing.

Clause 17: The aircraft as set forth in any one of clauses 11-16 wherein: the main propulsors remain at the first maximum amount of thrust during descent as the tilt-wing moves to the hover position; and the variable amount of thrust of the auxiliary propulsors decrease during descent when the tilt-wing is in the transition position.

Clause 18: A method of controlling an aircraft, the method comprising: moving a tilt-wing relative to a fuselage from a cruise position to a transition position, wherein the transition position is a plurality of positions between a hover position and the cruise position; implementing a first maximum amount of thrust to a plurality of main propellers by a plurality of main propulsors, wherein the main propellers are coupled to the tilt-wing such that the main propellers change orientation with movement of the tilt-wing relative to the fuselage to one of the cruise position, the transition position, and the hover position; implementing a variable amount of thrust to a plurality of auxiliary propellers by a plurality of auxiliary propulsors, wherein the auxiliary propellers are spaced apart from the tilt-wing; signaling, via a controller, the main propulsors to operate at the first maximum amount of thrust when the tilt-wing moves from the cruise position to the transition position; and signaling, via the controller, the auxiliary propulsors to operate at the variable amount of thrust when the tilt-wing is in the transition position in which the first maximum amount of thrust and the variable amount of thrust together provide an overall thrust to descend and land the aircraft.

Clause 19: The method as set forth in clause 18 further comprising: continuing to operate the main propulsors at the first maximum amount of thrust to provide a maximum slipstream velocity across the tilt-wing during descent as the tilt-wing moves from the transition position to the hover position; and decreasing the variable amount of thrust of the auxiliary propulsors during descent when the tilt-wing is in the transition position.

Clause 20: The method as set forth in clauses 18 or 19: further comprising operating the main propulsors at the first maximum amount of thrust during takeoff when the tilt-wing is in the hover position; wherein a threshold amount of thrust lifts the aircraft during takeoff when the tilt-wing is in the hover position; wherein the first maximum amount of thrust of the main propulsors is less than the threshold amount of thrust to lift the aircraft during takeoff; and further comprising operating the auxiliary propulsors at a second maximum amount of thrust which in combination with the first maximum amount of thrust of the main propulsors meet the threshold amount of thrust to lift the aircraft during takeoff when the tilt-wing is in the hover position.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

What is claimed is:

1. A control system for an aircraft having a fuselage, the control system comprising:
   a tilt-wing configured to be movable relative to the fuselage between a cruise position, a transition position, and a hover position, wherein the transition position is a plurality of positions between the hover position and the cruise position;
   a plurality of main propellers coupled to the tilt-wing such that the main propellers change orientation with movement of the tilt-wing relative to the fuselage to one of the cruise position, the transition position, and the hover position;

a plurality of main propulsors coupled to a respective one of the main propellers and the main propulsors are configured to provide a first maximum amount of thrust to the main propellers;

a plurality of auxiliary propellers spaced apart from the tilt-wing;

a plurality of auxiliary propulsors coupled to a respective one of the auxiliary propellers and the auxiliary propulsors are configured to provide a variable amount of thrust to the auxiliary propellers; and a controller in communication with the tilt-wing, the main propulsors, and the auxiliary propulsors, wherein the controller signals the main propulsors to operate at the first maximum amount of thrust when the tilt-wing moves from the cruise position to the transition position, and signals the auxiliary propulsors to operate at the variable amount of thrust that decreases when the tilt-wing is in the transition position in which the first maximum amount of thrust and the variable amount of thrust together provide an overall thrust to descend and land the aircraft.

2. The control system as set forth in claim 1 wherein:
a threshold amount of thrust lifts the aircraft during takeoff when the tilt-wing is in the hover position; and
the first maximum amount of thrust of the main propulsors is less than the threshold amount of thrust to lift the aircraft during takeoff.

3. The control system as set forth in claim 2 wherein the main propulsors operate at the first maximum amount of thrust and the auxiliary propulsors operate at a second maximum amount of thrust which in combination with the first maximum amount of thrust meet the threshold amount of thrust to lift the aircraft during takeoff when the tilt-wing is in the hover position.

4. The control system as set forth in claim 1 wherein the auxiliary propellers are fixed in a predetermined orientation relative to the fuselage regardless of the position of the tilt-wing.

5. The control system as set forth in claim 4:
further comprising a first support and a second support spaced apart from the first support;
wherein the tilt-wing is disposed between the first support and the second support;
wherein the first support and the second support are fixed in a predetermined orientation relative to the fuselage regardless of the position of the tilt-wing; and
wherein at least one of the auxiliary propellers is coupled to first support and at least one of the auxiliary propellers is coupled to the second support such that the auxiliary propellers are fixed in the predetermined orientation relative to the fuselage regardless of the position of the tilt-wing.

6. The control system as set forth in claim 1 wherein at least one of the auxiliary propellers is rotatable relative to the fuselage regardless of the position of the tilt-wing.

7. The control system as set forth in claim 6:
further comprising a first support and a second support spaced apart from the first support, and the first support is fixed in a predetermined orientation relative to the fuselage regardless of the position of the tilt-wing, and the second support is rotatable relative to the fuselage regardless of the position of the tilt-wing;
wherein the tilt-wing is disposed between the first support and the second support;

wherein the auxiliary propellers include a first auxiliary propeller coupled to the first support such that the first auxiliary propeller is fixed to the first support in a predetermined orientation; and
wherein the auxiliary propellers include a second auxiliary propeller coupled to the second support such that the second auxiliary propeller is rotatable in response to rotation of the second support.

8. The control system as set forth in claim 1 wherein:
the main propulsors operate independently of each other; and
the auxiliary propulsors operate independently of each other and independently of the main propulsors.

9. The control system as set forth in claim 1 wherein:
the main propellers include a plurality of first blades disposed substantially parallel to a plane when the tilt-wing is in the hover position; and
the auxiliary propellers include a plurality of second blades disposed substantially parallel to the plane when the tilt-wing is in the hover position.

10. The control system as set forth in claim 1 wherein the main propulsors remain at the first maximum amount of thrust during descent until the tilt-wing moves to the hover position.

11. An aircraft comprising:
a fuselage;
a control system including:
    a tilt-wing supported by the fuselage and movable relative to the fuselage between a cruise position, a transition position, and a hover position, wherein the transition position is a plurality of positions between the hover position and the cruise position;
    a plurality of main propellers coupled to the tilt-wing such that the main propellers change orientation with movement of the tilt-wing relative to the fuselage to one of the cruise position, the transition position, and the hover position;
    a plurality of main propulsors coupled to a respective one of the main propellers and the main propulsors are configured to provide a first maximum amount of thrust to the main propellers;
    a plurality of auxiliary propellers spaced apart from the tilt-wing;
    a plurality of auxiliary propulsors coupled to a respective one of the auxiliary propellers and the auxiliary propulsors are configured to provide a variable amount of thrust to the auxiliary propellers; and
    a controller in communication with the tilt-wing, the main propulsors, and the auxiliary propulsors, wherein the controller signals the main propulsors to operate at the first maximum amount of thrust when the tilt-wing moves from the cruise position to the transition position, and signals the auxiliary propulsors to operate at the variable amount of thrust that decreases when the tilt-wing is in the transition position in which the first maximum amount of thrust and the variable amount of thrust together provide an overall thrust to descend and land the aircraft.

12. The aircraft as set forth in claim 11 wherein:
a threshold amount of thrust lifts the aircraft during takeoff when the tilt-wing is in the hover position;
the first maximum amount of thrust of the main propulsors is less than the threshold amount of thrust to lift the aircraft during takeoff; and
the main propulsors operate at the first maximum amount of thrust and the auxiliary propulsors operate at a second maximum amount of thrust which in combination with the first maximum amount of thrust meet the threshold amount of thrust to lift the aircraft during takeoff when the tilt-wing is in the hover position.

13. The aircraft as set forth in claim 11 wherein at least one of the auxiliary propellers is rotatable relative to the fuselage regardless of the position of the tilt-wing.

14. The aircraft as set forth in claim 13:
further comprising a first support and a second support spaced apart from the first support, and the first support is fixed in a predetermined orientation relative to the fuselage regardless of the position of the tilt-wing, and the second support is rotatable relative to the fuselage regardless of the position of the tilt-wing;
wherein the tilt-wing is disposed between the first support and the second support;
wherein the auxiliary propellers include a first auxiliary propeller coupled to the first support such that the first auxiliary propeller is fixed to the first support in a predetermined orientation; and
wherein the auxiliary propellers include a second auxiliary propeller coupled to the second support such that the second auxiliary propeller is rotatable in response to rotation of the second support.

15. The aircraft as set forth in claim 11 wherein the auxiliary propellers are fixed in a predetermined orientation relative to the fuselage regardless of the position of the tilt-wing.

16. The aircraft as set forth in claim 15:
further comprising a first support and a second support spaced apart from the first support;
wherein the tilt-wing is disposed between the first support and the second support;
wherein the first support and the second support are fixed in a predetermined orientation relative to the fuselage regardless of the position of the tilt-wing; and
wherein at least one of the auxiliary propellers is coupled to first support and at least one of the auxiliary propellers is coupled to the second support such that the auxiliary propellers are fixed in the predetermined orientation relative to the fuselage regardless of the position of the tilt-wing.

17. The aircraft as set forth in claim 11 wherein
the main propulsors remain at the first maximum amount of thrust during descent as the tilt-wing moves to the hover position.

18. A method of controlling an aircraft, the method comprising:
moving a tilt-wing relative to a fuselage from a cruise position to a transition position, wherein the transition position is a plurality of positions between a hover position and the cruise position;
implementing a first maximum amount of thrust to a plurality of main propellers by a plurality of main propulsors, wherein the main propellers are coupled to the tilt-wing such that the main propellers change orientation with movement of the tilt-wing relative to the fuselage to one of the cruise position, the transition position, and the hover position;
implementing a variable amount of thrust to a plurality of auxiliary propellers by a plurality of auxiliary propulsors, wherein the auxiliary propellers are spaced apart from the tilt-wing;
signaling, via a controller, the main propulsors to operate at the first maximum amount of thrust when the tilt-wing moves from the cruise position to the transition position; and
signaling, via the controller, the auxiliary propulsors to operate at the variable amount of thrust that decreases when the tilt-wing is in the transition position in which the first maximum amount of thrust and the variable amount of thrust together provide an overall thrust to descend and land the aircraft.

19. The method as set forth in claim 18 further comprising continuing to operate the main propulsors at the first maximum amount of thrust to provide a maximum slipstream velocity across the tilt-wing during descent as the tilt-wing moves from the transition position to the hover position.

20. The method as set forth in claim 18:
further comprising operating the main propulsors at the first maximum amount of thrust during takeoff when the tilt-wing is in the hover position;
wherein a threshold amount of thrust lifts the aircraft during takeoff when the tilt-wing is in the hover position;
wherein the first maximum amount of thrust of the main propulsors is less than the threshold amount of thrust to lift the aircraft during takeoff; and
further comprising operating the auxiliary propulsors at a second maximum amount of thrust which in combination with the first maximum amount of thrust of the main propulsors meet the threshold amount of thrust to lift the aircraft during takeoff when the tilt-wing is in the hover position.

* * * * *